United States Patent [19]

Mitchell et al.

[11] Patent Number: 4,894,242
[45] Date of Patent: Jan. 16, 1990

[54] NUTRITIONAL RICE MILK PRODUCT

[76] Inventors: Cheryl R. Mitchell; Pat R. Mitchell, both of 446 N. Powers, Manteca, Calif. 95336; Robert Nissenbaum, 750 Homer Ave., Palo Alto, Calif. 94301

[21] Appl. No.: 174,832

[22] Filed: Mar. 29, 1988

Related U.S. Application Data

[62] Division of Ser. No. 856,300, Apr. 24, 1986, Pat. No. 4,744,992.

[51] Int. Cl.$^4$ ............................ A23L 1/10; A23L 2/38
[52] U.S. Cl. .......................................... 426/29; 426/44; 426/48; 426/52; 426/598; 426/565; 426/569; 426/570; 426/573; 426/584
[58] Field of Search ....................... 426/18, 28, 29, 48, 426/50, 51, 618, 656, 640, 598, 599, 658, 565, 569, 570, 573, 584

[56] References Cited

U.S. PATENT DOCUMENTS

| | | | |
|---|---|---|---|
| 3,644,126 | 2/1972 | Bodnar et al. | 426/48 |
| 4,235,965 | 11/1980 | Walon | 426/48 |
| 4,282,319 | 8/1981 | Conrad | 426/28 |
| 4,285,975 | 8/1981 | Glenister | 426/29 |

*Primary Examiner*—Marianne Cintins
*Attorney, Agent, or Firm*—John A. Bucher

[57] ABSTRACT

The method of the invention comprises selection of whole grain rice, either white or brown rice, which is liquefied, preferably with alpha-amylase enzymes, and then treated with relatively high levels of a glucosidase enzyme and/or a beta-amylase enzyme in a saccharifying step. The total enzymatic reaction time in both the liquefaction and saccharification steps is limited to prevent development of undesirable off-flavors to yield a non-allergenic rice milk produce having surprising milk-like texture and functionality, the rice milk product being characterized by the absence of a rice-like flavor and having a preferred composition defined as follows:

| | |
|---|---|
| Soluble Complex Carbohydrates | 10 to 70% of solids; |
| Maltose | 0 to 70% of solids; |
| Glucose | 5 to 70% of solids; |
| Ash or Minerals | 0.1 to 0.6% of solids; |
| Protein and Fat | 1 to 3.5% of solids; |
| Fiber | 0.05 to 0.4% of solids. |

The rice milk product can also be converted to a dried product.

26 Claims, No Drawings

NUTRITIONAL RICE MILK PRODUCT

FIELD OF THE INVENTION

The present invention relates to an enzymatic method for producing a milk-like rice liquid for use either as a beverage or in a variety of food products as well as a product of the method.

BACKGROUND OF THE INVENTION

The traditional Japanese method for the preparation of a nutritional, non-alcoholic beverage from rice requires the blending of steamed or cooked rice with rice koji. The rice koji is prepared by inocculating steamed or cooked rice with the spores of the mold (Aspergillus oryzae) and cultivating the inocculated rice.

The rice koji contains a significant conglomeration of enzymes, predominantly alpha-amylase. It is characterized by both dextrinizing or liquefying and saccharifying action on starch.

After cultivation or fermentation for periods between 4 and 48 hours, the saccharified mass is passed through a sieve or filter. Dependent upon the starting materials used, (polished or unpolished rice or combination thereof) the filtrate is a white or beige colored slurry having a distinctly sweet, rice-like taste. The texture and sweetness of the slurry is determined by the total solids and the degree of starch conversion and may be mildly sweet or thick and sweet (similar to a milkshake). This nutritional beverage prepared from rice is commonly termed amazake.

The amount of sweetness derived from the amazake is dependent upon the total solids of the liquid and the amount of time the rice is allowed to culture with the koji under optimum conditions. Sweet amazake products resulting from long culturing times have an inherent problem of developing a "flat" or "sour" flavor. This flat souring presumably is the result of microbial action in the nutrient rich media as well as the oxidation of fats naturally occurring in the rice.

In some cases, culturing is terminated prior to the development of this flat souring. However, this results in the limitation of the amount of conversion from rice starch to maltose, glucose and higher dextrins. Typically, amazake prepared using koji results in the relative formation of substantial quantities of maltose and very low levels of glucose typically no more than two to three percent of the total carbohydrates. This quantitative relationship between maltose and glucose is limited by the nature of the koji culture itself. It is these limitations on the quality and quantity of sugars produced in making amazake via the traditional koji method that prompted us to seek an alternative.

The use of enzymes as an alternative method for the liquefaction and saccharification of starch from grains and tubers other than rice is very well known for the production of 100% carbohydrate products including dextrins, fillers and sweeteners intended to be competitive with sucrose. In these products, usually made from corn, the starchcontaining portion of the grain or tuber is first separated from the non-starch containing portions before enzymatic conversion. Thus, a relatively pure starch is obtained which can be enzymatically converted and processed to produce a pure carbohydrate product free of impurities.

Because of the preliminary separation of the starch fragment from the grain, not only is a pure carbohydrate product obtained but the enzymatic conversion process is uncomplicated and uninhibited by the fat, fiber and protein contaminants. Unfortunately, this enzymatic conversion process yields a relatively pure carbohydrate product and therefore does not have the nutritional advantages yielded by the traditional koji method involving whole or ground rice.

Traditionally prepared amazake using koji produces a thick, pulpy type of beverage with a rice-like flavor, limited sweetness and stability, and in most cases a distinct sour flavor. Because of its textural and functional properties, this traditionally prepared amazake has a very limited usage, if any, as a substitute for milk.

Accordingly, there has been found to remain a need for improved rice liquids which can be employed either as a beverage or in the preparation of food products. Because of the generally non-allergenic response to rice, it may be anticipated that such products may have a similar characteristic of being generally non-allergenic.

As an example of other beverage products developed for this market, soy beverages have been employed recently as a milk substitute in powdered, canned and aseptic packaged form. Disadvantages associated with these soy-based milk substitutes arise primarily because of the allergenic response which many people have toward soy products, the bean-like flavor of the products and their common need for the addition of a sweetener.

As noted above, there has been found to remain a need for an improved rice liquid produce and method of its preparation.

Another invention set forth in an application copending with the above noted parent Ser. No. 856,504, filed Apr. 28, 1986, and now U.S. Pat. No. 4,756,912, and entitled RICE SYRUP SWEETENER PRODUCTION, and assigned to California Natural Products is related to the present invention and is accordingly incorporated herein by reference as though set forth in its entirety. The above noted reference involves rice syrup sweeteners which are formed by generally the same steps employed for the nutritional rice milk product of the present invention. However, as a final step, the rice syrup sweeteners are partially clarified, preferably by sieving and centrifuging in order to remove substantially all rice fiber from the product resulting in the rice syrup sweetener. That reference is incorporated herein to the extent that it may be of assistance in disclosing and facilitating a further understanding of the present invention.

SUMMARY OF THE INVENTION

It is an object of the invention to provide such an improved rice liquid, hereinafter referred to as a "rice milk" because of its surprising milk-like texture and functionality.

It is also an object to provide a method for producing the rice milk.

It is a further object of the invention to provide such a rice milk product which is also nutritional in nature because the method for producing the rice milk product of the invention employs as a starting material "whole grain rice". Within the present invention, whole grain rice refers to either white rice (polished) or brown rice (unpolished) unlike typical prior art corn products which are developed by enzymatic treatment of carbohydrate components removed or separated from the remainder of the grain.

In connection with the above objects, the present invention is based upon the discovery that enzymes could be used for treating whole grain rice as opposed to a purified starch slurry and that it would thereupon be possible to produce a rice liquid having nutritional values. At the same time, the invention is based upon the further discovery that it is possible to overcome the inherently limited sweetness of traditional koji prepared amazake by employing a relatively high level of a glucosidase enzyme either alone or in combination with a beta-amylase enzyme in a saccharification step to produce rice milk products or "modified amazake" products with a variety of glucose to maltose ratios while still having similar nutritional advantages as noted above.

It was further discovered in connection with the present invention that, through the controlled use of dextrinizing and saccharifying enzymes, it is possible to eliminate souring and to produce a sweet, nutritional, hypoallergenic product surprisingly similar in texture and functionality to cow's milk and very much unlike traditional amazake as discussed above.

The composition of the rice milk of the invention was found to include minerals, fats, fiber, protein, complex carbohydrates, vitamins, maltose and glucose. All of the above products derived from the starting material of whole grain rice itself. It is also noted in particular that the "complex carbohydrates" referred to above include oligosaccharides such as maltotriose, dextrins, and higher saccharides. In any event, all of these forms of complex carbohydrates according to the present invention may appear in the rice milk product in a wide variety depending upon the whole grain rice selected as a starting material and also upon characteristics of the process as will be described in greater detail below.

Accordingly, it is yet a further object of the invention to provide a method for producing a nutritional rice milk from whole grain rice which can be ground or otherwise divided to form particles of selected size. A rice water slurry containing approximately 25-40% dry weight rice is heated and then liquefied, preferably by treatment with an alpha- amylase enzyme as noted above to form a liquid slurry which is treated with a glucosidase enzyme in a saccharification step to yield a rice milk product retaining nutritional values from the whole grain rice and exhibiting a milk-like texture and functionality.

The concentration of glucosidase enzyme and the concentration of optionally employed beta-amylase enzyme in the saccharification step are set forth respectively in Diazyme Units and DP°. These standards are employed with the following explanation to assure a proper understanding of the invention. In that regard, the term "DP°" refers to Degrees of Diastic Power. A further definition as well as an extensive assay procedure in connection with that term is set forth for example in *Food Chemicals Codex*, third edition, beginning at page 484.

The term "Diazyme Units" refers to a Diazyme assay commercially available from Miles Laboratories, Inc., Elkhart, Ind. That term is employed herein at least partially since one glucosidase enzyme found suitable for use in the present invention comprises glucoamylase E.C. 3.2.1.3, 1, 4 - alpha - D-Glucan glucohydrolase, unit activity of about 200 Diazyme Units/ml. (available under the trade name Diazyme from Miles Laboratories, Inc., Elkhart, Ind.).

It is a further related object of the invention to provide such a method wherein at least about 440 Diazyme Units of glucosidase per kilogram of whole grain rice particles are employed in the saccharification step and the enzymatic reaction time for the saccharification step is limited to about three hours in order to prevent development of off-flavors.

It is yet a further related object of the invention to employ the glucosidase enzyme either alone or in combination with varying amounts of beta-amylase enzymes in order to produce a nutritional rice milk product having the composition:

| | |
|---|---|
| Soluble Complex Carbohydrates | About 10 to 70% of solids; |
| Maltose | About 0 to 70% of solids; |
| Glucose | About 5 to 70% of solids; |
| Non-Carbohydrate Nutritional Values | About 1 to 5% of solids. |

Yet another further related object of the invention consists of selecting the whole grain rice starting material and characteristics of the liquefaction and saccharification steps so that the rice milk product further includes nutritional values comprising ash or minerals at about 0.1 to 0.6% of solids, protein and fat at about 1 to 3.5% of solids and rice fiber at about 0.05 to 0.4% of solids.

The method of production for rice milk according to the present invention has been found to result in a rice milk product or modified amazake which can be substituted for milk, milk solids and other milk forms in the preparation of various food products including but not limited to beverages, puddings and other food products corresponding to various dairy-based dessert products.

It is yet another object of the invention to provide the rice milk product in combination with other components to form a variety of food products including but not limited to a novel ice cream analog and other products as listed above.

It has also been found that the rice milk or modified amazake product of the present invention can be dried, for example by drum drying and preferably by spray drying to form a dried rice milk-like product or modified amazake which can be stored and subsequently used either in its dried form or reconstituted to a liquid consistency.

Accordingly, it is yet a further object of the invention to provide both a dried rice milk-like product and method of its preparation.

It is a still further object to provide a nutritional rice milk product using whole grain rice as a starting material and employing a beta-amylase enzyme of at least 1,000 DP° per kilogram of whole grain rice in a saccharification step limited to about three hours. This process has been found to yield a high maltose rice milk product which is nutritional and non-allergenic while also being characterized by freedom from a rice-like and a milk-like texture and functionality.

Substantially greater amounts of the beta-amylase enzyme may be used if desired. However, it has generally been found to be preferred to use about 1,000 to 3,000 DP° of the beta-amylase enzyme per kilogram of whole grain rice to economically achieve the advantages of the invention. This high maltose rice milk product may also be converted to a dried product.

Numerous additional objects and advantages of the invention will be apparent from the following description which includes a number of examples to further define and fully disclose the invention.

DESCRIPTION OF THE PREFERRED EMBODIMENT

Generally, in the enzymatic conversion of the starch from grains such as corn, the starch containing fragment of the grain is first separated from the hull, germ and other grain portions before reaction with the added enzyme. In this way, contamination of the starch by proteins, fats and fibers is minimal and therefore processing is not complicated by these impurities. As a consequence of this preliminary starch separation, a purified carbohydrate product is produced having none of the nutritional advantages found in whole or ground grains as used in traditional koji preparation of amazake.

We found in our invention that whole grain rice (white or brown) can be ground or divided and used in an enzymatic process. Consequently, contamination by protein, fat, and fiber may be expected to cause significant deviations in enzymatic activity and processing conditions. In the typical enzymatic conversion of purified starches, reaction parameters such as time, temperature, pH and water concentration of the starch slurry are usually adjusted to obtain hydration and swelling of the starch so that the liquefying alpha-amylase enzymes works under optimum conditions to break down and dextrinize the starch completely with a minimum of starch retrogradation. The same reaction parameters are then adjusted for optimum enzyme activity during saccharification.

In our invention, it is preferred to carry out enzymatic saccharification of whole grain rice with a glucosidase enzyme at the natural pH of rice slurry, that is, about 6.3 or within a range of 6.0 to 6.5. In addition the pH may be adjusted for example, to an optimum level required by the enzyme. In either event, saccharification according to the invention results in a milk-like product which is highly palatable and characterized by absence of a rice flavor. We have also found, that by increasing the saccharifying enzyme dosage from two to ten times that necessary to convert an equivalent amount of purified starch and by maintaining enzyme reaction time of less than about four hours, a modified amazake can be produced having no sour flavor while exhibiting unique functional properties and economic advantages unlike traditional koji amazake.

In other words, the rice milk or modified amazake of the invention prepared with glucosidase with or without beta-amylase enzymes during saccharification has a composition based on total solids as set forth in Table I.

Table I from about 5 to 70% glucose
from about 0 to 70% maltose, and
from about 10 to 70% complex carbohydrates.

By contrast, prepared amazake from the prior art has the following composition based on total carbohydrates: about 3 to 5% glucose, from about 20 to 45% maltose, and from about 30 to 70% higher saccharides.

As noted above, the rice milk product, because of the selecteion of whole grain rice as a starting material, includes substantial nutritional values as were also discussed and summarized above. Accordingly, the preferred composition set forth above in Table I further comprises nutritional values which, according to the present invention, comprise ash or minerals at about 0.1 to 0.6% of solids, protein and fat at about 1 to 3.5% of solids and rice fiber at about 0.05 to 0.4% of solids. These materials are only representative of the nutritional values in the rice milk product which may also include other nutritional values such as vitamins, for example.

In the process of this invention, steamed or cooked rice material, selected from the group consisting of polished, unpolished, partially polished or any combination thereof, in a slurry of from 25-40% of rice weight basis, is liquefied with alpha-amylase enzyme having dextrinizing activity and which is produced from a micro-organism selected from *Bacillus subtillus, Bacillus Stearothermophilus* and *Bacillus licheniformis* or a fungal source such as *Aspergillus oryzae,* substantially free from protease, at a temperature of from 30° C. to 100° C. and at a pH of from 3.5 to 7.5 to yield a liquefied slurry.

The liquefied slurry is then cooled to from 45° to 65° C. and the saccharifying enzyme or enzymes are added. The pH may be maintained at about the normal pH of rice, i.e., about 6.3, or may be adjusted to from 3.5 to 7.5. The saccharifying enzymes include a glucosidase which is glucose liberating and which is produced by a micro-organism selected from many species of Rhizopus or Bacillus, strains of the *Aspergillus niger* group, *Aspergillus oryzae,* Muco species, Endomyces species, Endomyces fibuliger, *Saccharomyces diastaticus, Chlostridium acetobutylicum* and possibly a beta-amylase (which is maltose liberating) extracted from either barley, wheat, rye, sweet potatoes or soybeans.

Glucosidase enzymes used in the saccharification step are available from a number of sources including Miles Laboratories, Elkhart, Ind.; Novo Industries, Denmark and the FinnSugar Group, Finland. Trade names for glucosidase products from Miles Laboratories are set forth in certain of the examples. Similar glucosidase enzymes are available from Novo Industries under the trade name Amyloglucosidase Novo.

It will of course be apparent from the preceding comments that numerous other glucosidase enzymes can similarly be employed in the saccharification step of the present invention. The beta-amylase enzymes which are also optionally emplyed within the saccharification step are believed to be sufficiently well-known that no further discussion is required.

The dosage level of added saccharification enzyme is anywhere from two to ten times that necessary for the analogous conversion of an equivalent amount of purified starch, the dosage level being dependent upon the quantity and type of sugar to be liberated. After the slurry has been allowed to react with the saccharifying enzyme a relatively short period of time (less than four hours) the slurry can then be sieved and/or centrifuged to remove unwanted fiber, fat or amylose. The filtrate or modified amazake, of varying glucose and maltose content depending upon the quantity and type of saccharifying enzyme used, can then be dried via spray or drum dryer, or reduced in moisture to a concentrate of between 60 and 85% soluble solids, or pasteurized and immediately cooled to between 0° and 18° C. for use as a liquid.

Accordingly, the process of the present invention initially involves the selection of whole grain rice as a starting material.

The whole grain rice is liquefied, preferably employing alpha-amylase enzyme to produce a liquid slurry. In order to prevent development of undesirable off-flavors, the enzymatic liquefication step is preferably limited to no more than about one hour.

Thereafter, the liquid slurry is subjected to a saccharification step employing a high level of a glucosidase enzyme, either alone or in combination with a beta-amylase enzyme, to form an enzyme system substantially excluding other enzymes in order to achieve the desired milk-like texture and functionality realized for the rice milk product of the invention.

The manner of defining the amount and activity of the glucosidase and beta-amylase enzymes for purposes of the present invention are set forth in EXAMPLE 1. In any event, the glucosidase enzyme is present from about 440 to about 2,200 Diazyme Units per kilogram of whole grain rice (see EXAMPLE 1). The beta-amylase enzyme is optionally present in an amount from about 1,000 to 3,000 degrees of Diastic Power (DP°) per kilogram of whole grain rice.

In order to achieve desired conversion while further preventing development of undesirable off-flavors, the saccharification step is also limited, preferably to about three hours and more preferably within the range of about two to three hours.

It has further been found that the milk-like texture and functionality of the resulting rice milk product is enhanced if the pH of the saccharification step is maintained approximately equal to the pH of natural rice (about 6.3). Accordingly, the pH of the saccharification step is most preferably limited to the range of about 6 to 6.5.

However, it has further been found possible to generally maintain the desirable milk-like texture and functionality of the product even with the pH of the saccharification step being adjusted, generally toward acid levels. In this regard, it is often considered desirable to adjust the pH to a range of about 3.5 to 7 in order to enhance enzymatic activity. Accordingly, that range is a broader preferred range within the present invention.

The solids content of the rice milk or modified amazake may be adjusted to between 8 and 28% soluble solids by the addition of water to yield a milk-like beverage very similar in appearance and taste to milk. If desired, up to 5% vegetable oil may be added and the mixture homogenized to yield a rice beverage having a fatty texture or "mouthfeel" similar to whole milk.

The rice milk or modified amazake of this invention can also be used in the preparation of a novel frozen dessert. The rice milk or modified amazake is used as a replacement for both the milk and sugar in a standard ice cream mix. The rice milk or modified amazake is blended with from 0 to 12% by weight vegetable oil, from 0 to 1% by weight stabilizers, from 0 to 12% flavors, from 0 to 1% salt, the blend heated to between 65° and 70° C., homogenized at between 2,000 and 3,000 PSI, cooled to between 0° and 18° C., additional flavors added if desired and the mix frozen and packaged according to standard practice in ice cream manufacturing.

The rice milk or modified amazake provided in this invention can also be used in the preparation of other frozen desserts, puddings or whipped toppings by the replacement in standard formulations for milk solids, sugar solids, corn syrup solids and or moisture content by the rice milk or modified amazake.

The rice milk or modified amazake provided in this invention of varying glucose to maltose ratios may be dried to a powder form by using drum type dryers, spray dryers or the like. The resulting powder may then be ground or sifted, or agglomerated as needed to a size of between 4 and 300 mesh. This dried powder may then be used as a replacement for corn syrup solids, powdered milk, sweeteners, or any combination thereof. The rice milk or modified amazake may also be used as a source of complex carbohydrates.

Another application of the rice milk or modified amazake prepared by this new process is in the preparation of 100% rice solids concentrate by concentration of the rice milk or modified amazake. The rice milk or modified amazake is concentrated to between 60 and 85% soluble solids by using a vacuum type evaporator.

Having outlined the steps in our invention we will now provide detailed examples of the process for preparing rice milk of varying sugar content; preparation of non-dairy desserts using rice milk or modified amazake; preparation of milk substitutes using the rice milk or modified amazake of this invention; preparation of novel frozen desserts by using modified amazake of this invention; preparation of powdered rice milk or modified amazake by using the rice milk or modified amazake of this invention; preparation of instant dessert mixes and beverages using the powdered rice milk or modified amazake of this invention; preparation of 100% rice concentrates by using the rice milk or modified amazake of this invention.

EXAMPLE 1

Rice Milk Containing Approximately 10% Glucose

Forty-five kilograms of milled white rice of thirty (30) mesh were added to 100 Liters cold tap water having a calcium ion content of 250 ppm (the calcium could be present in the water naturally or added in the form of a calcium salt) in a steam jacketed 225 Liter kettle under constant agitation. One hundred grams of bacterial alpha-amylase of Bacillus subtilis origin with an activity of 1,200,000 modified Wohlgemuth Units per gram were added to the water. The temperature of the suspension was gradually increased to 80° C. and held for approximately 30 minutes. The temperature was then increased to 100° C. and held there for an additional 15 minutes. The slurry was then cooled to approximately 60° C., 50 ml of Barley beta-amylase with an activity of 1,500 degrees of Diastic Power per ml, as well as 100 ml of glucosidase E.C. 3.2.1.3, 1,4-alpha-D-Glucan glucohydrolase, unit activity of 200 Diazyme units/ml (Diazyme assay is available upon request from Miles Laboratories, Inc., Elkhart, Ind.) were added. The slurry was held at 60° C. for two hours after which it was sieved through a 30 mesh screen to produce a liquid similar in appearance to milk. This rick milk or rice milk product had the composition of 10% glucose and 35% maltose based on total solids and a total soluble solids content of 31%.

The rice milk product produced in EXAMPLE 1 has the nutritional advantage of high maltose and complex carbohydrates which are metabolized more slowly than glucose and hence do not result in rapid blood sugar increase. The use of glucosidase enzyme in conjunction with beta-amylase enzyme yields a product with slightly increased sweetness as well as less rice-like flavor when compared with traditional koji amazake. The textural properties are similar to milk, particularly condensed milk and the high dextrin concentration allows for easier drying of the rice milk product with good dispersibility of the dried product upon reconstitution with water. The dried product can be used as a mildly sweet, bland filler in powdered food formulations.

EXAMPLE 2

Rice Milk Containing Approximately 70% Glucose

Forty-Five kilograms of milled brown rice of twenty (20) mesh were added to 80 Liters cold tap water in a steam jacketed 225 Liter kettle under constant agitation. One hundred grams of bacterial alpha-amylase of Bacillus subtilis origin with an activity of 1,200,000 modified Wohlgemuth Units per gram were added to the water initially. The temperature of the suspension was gradually increased to 80° C. and held for approximately 30 minutes. The temperature was then increased to 100° C. and held there for an additional 15 minutes. The slurry was then cooled to approximately 60° C., 450 ml of glucoamylase E.C. 3.2.1.3, 1,4-alpha-D-Glucan glucohydrolase, unit activity of 200 Diazyme units/ml (Diazyme assay is available upon request from Miles Laboratories, Inc., Elkhart, Ind.) being added. The slurry was held at a constant temperature for three hours after which it was then sieved and centrifuged to produce a liquid similar in appearance to milk. This rice milk or modified amazake had the composition of 70% glucose based on total solids with a total soluble solids content of 31%.

The rice milk product produced in EXAMPLE 2 has economic advantages from the standpoint that when the product is diluted with water or air in the case of ice cream, it yields a very acceptable sweetness level with obviously no additional sweetener needed. At 30% soluble solids, the rice milk product is generally too sweet to be used as a beverage directly. The high glucose also provides an increased freezing point depression which is an essential part of making a non-dairy ice cream analog which is creamy in texture as opposed to being hard and icy. Upon drying of this rice milk product, a very sweet powder results which is acceptable for use as a sweetener in powdered food formulations.

EXAMPLES 1 and 2 are representative of a broad range of rice milk products which can be prepared according to the present invention. The products resulting from both EXAMPLES 1 and 2 are representative of the invention in that they have surprising milk-like texture and functionality while being almost entirely free of a rice-like flavor and retaining the non-allergenic properties from the rice itself. Furthermore, the products of both EXAMPLES 1 and 2 have retained nutritional values present because of the whole grain rice employed as a starting material. These desirable properties for the products of EXAMPLES 1 and 2 are also retained in the other following EXAMPLES which are based upon either EXAMPLE 1 or 2.

EXAMPLE 3

Non-Dairy Pudding From Rice Milk

Eight grams of alginate (Protanal PM673; Protan, Drammen, Norway) were blended in a bowl with 250 g of the rice milk product of EXAMPLE 2 and vigorously agitated for one minute using a mechanical stirrer. An additional 300 g of the rice milk product of EXAMPLE 2 were slowly added under constant stirring and allowed to sit for 30 to 45 minutes. A very acceptable pudding was produced.

Milk based puddings are produced by cooking milk, sugar and starch together. These milk puddings have soluble solids content approximately 30%. By using the rice milk product of EXAMPLE 2, with approximately 30% soluble solids, no sugar or sweetener need be added. Consequently, only the alginate, starch, gelling, or thickening agent need be considered to produce a very sweet non-dairy pudding of desired consistency. Therefore, the product has simple ingredient labeling being predominantly a rice milk product.

EXAMPLE 4

Rice Beverage (Milk Substitute) from Rice Milk

One liter of the Rice Milk Product of EXAMPLE 2 was diluted with cold water to obtain a total soluble solids of 13%. To 1 liter of the above 13% soluble solids beverage were added 2.5 g safflower oil, 0.005 g salt, and the mixture homogenized at 2,500 PSI. A pleasing milk-like beverage was produced.

A major economic advantage of the high glucose rice milk product of EXAMPLE 2 is that it can be diluted with water to about 13% soluble solids to produce a beverage of acceptable sweetness. The diluted product of EXAMPLE 4 is very similar to cows milk with regard to texture and mouthfeel.

EXAMPLE 5

Non-Dairy Frozen Dessert

Four liters of the rice milk product of EXAMPLE 2 (approximately 28% soluble solids) were blended with 400 g safflower oil, 120 g vanilla, 20 g salt, and 20 g carrageenan, the blend heated to 75° C. and homogenized at 2,500 PSI. The mix was then cooled to 18° C. and the mix packaged and frozen according to standard practice in ice cream manufacturing.

The frozen dessert outlined in EXAMPLE 5 has a high freezing point depression resulting in a creamy product without crystalline brittleness caused by ice crystals. The ingredient declaration for this product is simplified since no added sweetener is required as is common with all other ice creams or frozen dessert products. Again, the rice milk product of EXAMPLE 2 allows for the dilution by air of the non-dairy ice cream mix resulting in an increased economical advantage for the use of a high glucose rice milk.

EXAMPLE 6

Powdered Rice Milk Product

Rice milk product of EXAMPLE 2 (approximately 28% soluble solids) was pumped through a standard air atomized spray dryer having an inlet temperature of 120° C. and was collected as a white dry powder of approximately 60 to 300 mesh.

The powdered form of the rice milk product of EXAMPLE 2 can be used to replace glucose or fructose derived from corn and containing allergens associated with corn. Because no refining is done as is with sucrose from sugar beet or cane sugar, this powdered rice milk product provides a more natural and nutritionally balanced sweetener. The presence of complex carbohydrates, proteins, fat and minerals also make this powdered sweetener more attractive as a nutritional sweetener.

The powdered rice milk product made from the rice milk of EXAMPLE 1 has much less sweetening power than the product of EXAMPLE 2 but is more desirable as a source of complex carbohydrate or filler powder in formulations where a bland powder is required for bulking purposes and source of complex carbohydrates.

EXAMPLE 7

Instant Brownie Mix Containing Powdered Rice Milk Product

The following ingredients were blended to make a brownie mix:
200. g Powdered Rice Milk Product of EXAMPLE 6
55. g Flour
2.5 g Baking Powder
3.5 g Salt
25. g Cocoa Powder Preparation of brownies using the above brownie mix: To the above mix were added 112 g butter, one egg and 2 g vanilla extract. The mixture was stirred until uniform, then poured into a greased 23×23 cm pan and baked 25 minutes at 175° C. A tasty brownie product was produced.

This EXAMPLE is representative of applications where the powdered rice milk product of EXAMPLE 6 can be used to replace the sugar and milk of a standard brownie mix recipe. The brownies produced are suitable for people with dairy allergies with the added advantage of including a nutritional rice sweetener.

EXAMPLE 8

Instant Chocolate Flavored Beverage Mix

The following ingredients were blended to make a nondairy cocoa mix:
25. g Cocoa Powder
1.5 g Salt
120. g Powdered Rice Milk Product of EXAMPLE 6

The hot chocolate beverage of this EXAMPLE was prepared by mixing the above components to form an instant chocolate flavored beverage mix. Eight hundred milliliters of boiling water were added with constant stirring. The mixture was beaten with a wire wisk prior to serving.

The product of EXAMPLE 8 illustrates how the powdered rice milk product of EXAMPLE 6 can be used as a replacement for the sugar and milk portion in a cocoa mix.

EXAMPLE 9

High Maltose Rice Milk

The steps of EXAMPLE 1 were repeated except that 100 ml of beta-amylase enzyme were used without any glucosidase enzyme.

This resulted in a product having about 3% glucose and about 55% maltose, the composition and characteristics of the product otherwise being as described above in EXAMPLE 1. In particular, the high maltose rice milk was found capable of being dried in the same manner set forth in EXAMPLE 6 to yield a dried high maltose rice milk.

EXAMPLES 3–9 are further representative of a wide variety of food products which can be formed from rice milk product prepared for example in accordance with EXAMPLES 1 and 2. In particular, as is demonstrated by EXAMPLE 6, the rice milk product of the present invention particularly lends itself either to drum drying or preferably to spray drying in order to form a dried product which can either be used as is or stored and later reconstituted to form a liquid product.

Numerous variations and modifications are obvious from the preceding description. Accordingly, the scope of the present invention is defined only by the following appended claims.

What is claimed is:

1. A nutritional rice milk product produced by a method comprising the steps of
    selecting a starting material as a whole grain rice and dividing it into particles of reduced size,
    liquifying the whole grain rice particles with a alphaamylase enzyme in an aqueous medium to form a liquid slurry, and
    treating the liquid slurry with glucosidase enzyme in a saccharification step for a period of less than about three hours in order to yield a rice milk product retaining nutritional components from the whole grain rice, having a glucose content of about 5 to 70% of solids, a protein content on a dry-weight basis of less than about 3.5%, the rice milk product being distinctly cloudy and colloidal or non-filtratable.

2. The product of claim 1 wherein at least about 440 Diazyme Units of glucosidase enzyme per kilogram of whole grain rice particles are employed in the saccharification step.

3. The product of claim 2 wherein the rice milk product is formed into a food product selected from the group consisting of frozen desserts, instant dessert mixes, puddings, whipped toppings, flavored beverages, and milk substitute or modified amazake beverages.

4. The product of claim 2 wherein the total enzymatic reaction time for both the liquifaction and saccharification steps is from about two to four hours in order to yield a rice milk product having desired enzymatic conversion without the development of undesirable flat-sour flavors.

5. The product of claim 2 wherein about 440 to 2,200 Diazyme Units of glucosidase enzyme per kilogram of whole grain rice particles are employed in the saccharification step.

6. The product of claim 5 wherein up to about 3,000 BP° of beta-amylase enzyme per kilogram of whole grain rice particles are also employed in the saccharification step in order to yield the resulting nutritional rice milk product having total solids of about 30%, balance essentially water, with a composition of:

| | |
|---|---|
| Soluble complex carbohydrates | about 10 to 70% of solids; |
| Maltose | about 0 to 70% of solids; |
| Glucose | about 5 to 70% of solids; |
| Non-carbohydrate nutritional components | about 1 to 5% of solids; and |
| Fiber | about 0.05 to 0.4% of solids. |

7. The product of claim 6 wherein the rice milk product is formed into a food product selected from the group consisting of frozen desserts, instant dessert mixes, puddings, whipped toppings, flavored beverages, and milk substitute or modified amazake beverages.

8. The product of claim 6 wherein the starting material is selected as whole grain rice particles and the liquifaction and saccharification steps are performed so that the resulting nutritional rice milk product having nutritional components comprising ash or minerals at about 0.1 to 0.6% of solids and protein and fat at about 1 to 3.5% of solids.

9. The product of claim 6 wherein the saccharification step is carried out at a pH in the range of about 6 to 6.5 approximating the natural pH of rice.

10. The product of claim 6 wherein the saccharification step is carried out at a pH in the range of about 3.5 to 7.

11. The product of claim 6 produced from the method further comprising the step of drying the rice milk product to substantially remove water and thereby forming a dried rice milk product.

12. The product of claim 11 wherein the dried rice milk product is formed into a food product selected from the group consisting of frozen desserts, instant dessert mixes, puddings, whipped toppings, flavored beverages, and milk substitute or modified amazake beverages.

13. The product of claim 2 produced from the method further comprising the step of drying the rice milk product to substantially remove all water resulting in a dried rice milk product.

14. The product of claim 13 wherein the dried rice milk product is formed into a food product selected from the group consisting of frozen desserts, instant dessert mixes, puddings, whipped toppings, flavored beverages, and milk substitute or modified amazake beverages.

15. A nutritional rice milk product formed by a method comprising the steps of
selecting as a starting material a whole grain rice and dividing it into particles of reduced size,
combining the whole grain particles in an aqueous medium substantially free from protease with an alpha-amylase enzyme in a liquifaction step in an amount sufficient and for a period of time limited in enzyme reaction duration to about one hour which is sufficient to form a liquid slurry while permitting desired enzymatic liquifaction and preventing development of undesirable flat-sour flavors, and
treating the liquid slurry with an enzymatic system including a glucosidase enzyme of at least about 440 Diazyme Units per kilogram of whole grain rice particles in a saccharification step limited in enzyme reaction duration to about three hours, the amount of glucosidase enzyme and the enzyme reaction duration being sufficient to permit desired enzymatic reaction while preventing development of undesirable flat-sour flavors in order to yield the rice milk product retaining nutritional components from the whole grain rice, having a protein content on a dry-weight basis of less than about 3.5%, the rice milk product being distinctly cloudy and colloidal or non-filtratable.

16. The product of claim 15 wherein the amounts of glucosidase and beta-amylase enzymes are selected to yield the nutritional rice milk product having total solids of about 30%, balance essentially water, with a composition of:

| | |
|---|---|
| Soluble complex carbohydrates | about 10 to 70% of solids; |
| Maltose | about 0 to 70% of solids; |
| Glucose | about 5 to 70% of solids; |
| Non-carbohydrate nutritional components | about 1 to 5% of solids; and |
| Fiber | about 0.05 to 0.4% of solids. |

17. The product of claim 16 wherein the starting material is selected as divided whole grain rice particles and the liquifaction and saccharification steps are selected to yield the rice milk product having nutritional components comprising ash or minerals at about 0.1 to 0.6% of solids and protein and fat at about 1 to 3.5% of solids.

18. The product of claim 17 wherein the rice milk product is formed into a food product selected from the group consisting of frozen desserts, instant dessert mixes, puddings, whipped toppings, flavored beverages, and milk substitute or modified amazake beverages.

19. A rice milk product having a milk-like or distinctly cloudy appearance and enzymatically produced by liquifaction followed by saccharification to have about 30% total solids, balance essentially water, and a composition of:

| | |
|---|---|
| Soluble complex carbohydrates | about 10 to 70% of solids; |
| Maltose | about 0 to 70% of solids; |
| Glucose | about 5 to 70% of solids; |
| Non-carbohydrate nutritional components | about 1 to 5% of solids; and |
| Fiber | about 0.05 to 0.4% of solids. |

20. The product of claim 19 wherein the rice milk product has nutritional components comprising ash or minerals at about 0.1 to 0.6% of solids and protein and fat at about 1 to 3.5% of solids.

21. The product of claim 20 being dried to substantially remove water for yielding a dried rice milk product.

22. The product of claim 19 being dried to substantially remove water and form a dried rice milk product.

23. The product of claim 21 being wherein the dried rice milk product is formed into a food product selected from the group consisting of frozen desserts, instant dessert mixes, puddings, whipped toppings, flavored beverages, and milk substitute or modified amazake beverages.

24. The product of claim 19 being wherein the rice milk product is formed into a food product selected from the group consisting of frozen desserts, instant dessert mixes, puddings, whipped toppings, flavored beverages, and milk substitute or modified amazake beverages.

25. A nutritional rice milk product formed by a method comprising the steps of
selecting as a starting material whole grain rice particles,
liquifying the whole grain rice particles with an alpha-amylase enzyme in an aqueous medium substantially free from protease in an amount and for a period of time sufficient to form a liquid slurry, and
treating the liquid slurry with a beta-amylase enzyme in a saccharification step with at least about 1,000 BP° of betaamylase enzyme per kilogram of whole grain rice particles, the reaction time for the saccharification step being limited to about three hours, the amount of beta-amylase enzyme and the reaction time being sufficient to yield the rice milk product retaining nutritional components from the whole grain rice and exhibiting a milk-like or distinctly cloudy appearance without development of flat-sour flavors.

26. The product of claim 25 formed from the method further comprising step of drying the rice milk product to substantially remove water in order to form a dried rice milk product.

* * * * *